(12) United States Patent
Pan et al.

(10) Patent No.: US 10,640,348 B2
(45) Date of Patent: May 5, 2020

(54) PALLET CARRIER

(71) Applicant: NINGBO RUYI JOINT STOCK CO., LTD.

(72) Inventors: Zhenyu Pan, NingBo (CN); Feng Tian, NingBo (CN); Zhenli Feng, NingBo (CN); Zefeng Yang, NingBo (CN); Liangzhu Wu, NingBo (CN); Yaoyao Zhang, NingBo (CN); Ji Chen, NingBo (CN); Haoxiang Fang, NingBo (CN)

(73) Assignee: NINGBO RUYI JOINT STOCK CO., LTD., Ningbo (CN)

( * ) Notice: Subject to any disclaimer, the term of this patent is extended or adjusted under 35 U.S.C. 154(b) by 225 days.

(21) Appl. No.: 15/863,939

(22) Filed: Jan. 7, 2018

(65) Prior Publication Data

US 2018/0334368 A1    Nov. 22, 2018

(30) Foreign Application Priority Data

May 19, 2017  (CN) .......................... 2017 1 0356045
Aug. 31, 2017  (CN) ...................... 2017 2 1111021 U
Sep. 15, 2017  (CN) ...................... 2017 2 1183280 U
Oct. 19, 2017  (CN) ...................... 2017 2 1346666 U
Oct. 19, 2017  (CN) ...................... 2017 2 1347507 U

(51) Int. Cl.
*B66F 9/075* (2006.01)
*B66F 9/22* (2006.01)
(Continued)

(52) U.S. Cl.
CPC .......... *B66F 9/07572* (2013.01); *B60T 13/04* (2013.01); *B60T 13/748* (2013.01); *B62B 3/0612* (2013.01); *B62B 5/004* (2013.01); *B62B 5/0053* (2013.01); *B66F 9/07509* (2013.01); *B66F 9/07531* (2013.01); *B66F 9/07568* (2013.01); *B66F 9/22* (2013.01);
(Continued)

(58) Field of Classification Search
CPC .............. B66F 9/07572; B66F 9/07509; B66F 9/07531; B66F 9/07536; B66F 9/0754; B66F 9/24
See application file for complete search history.

(56) References Cited

U.S. PATENT DOCUMENTS 2,592,091 A * 4/1952 Weaver ................ B62B 3/0612
  180/214
3,223,192 A * 12/1965 Dorion ................ B62B 3/0612
  180/13
(Continued)

FOREIGN PATENT DOCUMENTS

| CN | 203807075 U | * 9/2014 |
| CN | 104773193 A |   7/2015 |
| EP | 2018989 A   |   1/2009 |

*Primary Examiner* — Tyrone V Hall, Jr.
(74) *Attorney, Agent, or Firm* — Innovation Capital Law Group, LLP; Vic Lin

(57) ABSTRACT

The present invention provides a pallet carrier, comprising a carrier frame structure; a fork structure disposed on the carrier frame structure; a driving wheel structure comprising driving wheels that are articulated to the carrier frame structure, wherein each one of the driving wheels is set as a one-piece wheel structure integrated with a driving motor and a hub. The pallet carrier has the advantages of simple structure and work reliability.

18 Claims, 14 Drawing Sheets

(51) Int. Cl.

| | | |
|---|---|---|
| *B66F 9/24* | (2006.01) | |
| *B66F 17/00* | (2006.01) | |
| *F16D 55/22* | (2006.01) | |
| *F16D 65/095* | (2006.01) | |
| *F16D 65/18* | (2006.01) | |
| *B60T 13/04* | (2006.01) | |
| *B60T 13/74* | (2006.01) | |
| *F16D 55/226* | (2006.01) | |
| *B62B 5/00* | (2006.01) | |
| *B62B 3/06* | (2006.01) | |
| *F16D 121/20* | (2012.01) | |
| *F16D 121/22* | (2012.01) | |
| *F16D 121/14* | (2012.01) | |
| *B62B 5/04* | (2006.01) | |

(52) U.S. Cl.
CPC .............. *B66F 9/24* (2013.01); *B66F 17/003* (2013.01); *F16D 55/22* (2013.01); *F16D 55/226* (2013.01); *F16D 65/095* (2013.01); *F16D 65/183* (2013.01); *B62B 2005/0471* (2013.01); *F16D 2121/14* (2013.01); *F16D 2121/20* (2013.01); *F16D 2121/22* (2013.01)

(56) References Cited

U.S. PATENT DOCUMENTS

| | | | | |
|---|---|---|---|---|
| 7,789,175 B2* | 9/2010 | Tobey | ............... | A61G 5/045 180/264 |
| 8,540,213 B2* | 9/2013 | Feiquan | ............... | B66F 9/065 254/2 C |
| 9,475,513 B2* | 10/2016 | Liu | ............... | B62B 3/0612 |
| 2009/0078483 A1* | 3/2009 | Grothkopp | ............... | B62B 3/0612 180/68.5 |
| 2012/0048629 A1* | 3/2012 | Magens | ............... | B66F 9/065 180/65.31 |
| 2015/0102274 A1* | 4/2015 | He | ............... | B62B 3/0618 254/2 C |
| 2016/0311670 A1* | 10/2016 | Huether | ............... | B62B 3/0606 |

* cited by examiner

PALLET CARRIER

CROSS-REFERENCE OF RELATED APPLICATIONS

This application claims priority under 35 USC § 119 to Chinese Patent Application No. 201710356045.6, filed on May 19, 2017, Chinese Patent Application No. 201721111021.6, filed on Aug. 31, 2017, Chinese Patent Application No. 201721183280.X, filed on Sep. 15, 2017, Chinese Patent Application No. 201721346666.8, filed on Oct. 19, 2017, Chinese Patent Application No. 201721347507.X, filed on Oct. 19, 2017. The entire contents of each of the above-identified applications are hereby incorporated by reference.

TECHNICAL FIELD

The present invention relates to the technical field of carrier vehicles, in particular to a pallet carrier.

DESCRIPTION OF RELATED ART

In the prior art, a pallet carrier normally includes a fork, traveling wheels placed behind the fork, and a driving motor for driving the traveling wheels to travel. The traveling motor is connected to transmission mechanisms such as a gearbox and traveling wheels. For pallet carriers configured in this way, the driving and traveling structure behind the fork is complicated and occupies a large space, and the driving motor is connected to the traveling wheels through the gearbox, so the maintenance is troublesome.

BRIEF SUMMARY OF THE INVENTION

The objective of the present invention is to put forward a pallet carrier which has a simple structure and works reliably to overcome the defects in the prior art.

The objective of the present invention can be achieved by the following technical solution. A pallet carrier includes:

a carrier frame structure;

a fork structure, disposed on the carrier frame structure;

a driving wheel mechanism, including driving wheels which are articulated to the carrier frame structure, wherein the driving wheels are configured on a one-piece structure which is integrated with a driving motor and wheel hubs.

Further, each one of the driving wheels includes a hub motor main body and a connecting shaft which is articulated with the hub motor main body, and each one of the connecting shafts extends out of each corresponding hub motor main body and is connected to the carrier frame structure.

Further, the driving wheel mechanism also includes a brake structure, and the brake structure includes a brake disc which is disposed on one side of the hub motor main body and a disc brake structure which plays the role of actuating the brake disc.

Further, the disc brake structure includes a brake which is installed on the carrier frame structure through a bracket.

Further, the brake and the bracket are installed with a floating structure, and the brake and the bracket form a preset floating interval there-between.

Further, the connecting shafts separately stand on two sides of each one of the hub motor main bodies; a driving base is rotationally installed behind the fork structure; the lower part of the driving base is set as a seat structure of which the two ends respectively correspond to the connecting shaft structures on two sides, and the connecting shaft structure on each side is in a rigid connection with each corresponding seat structure.

Preferably, the carrier frame structure is formed with a power supply mounting hole. The pallet carrier also includes a power supply unit which is set as a battery pack structure, wherein the power supply unit can be inserted into the power supply mounting hole and is limited therein.

Preferably, an electric assembly of the pallet carrier is installed at the bottom of the power supply mounting hole, and a limiting hole is dug at the bottom of the power supply unit.

Further, the opening of the power supply mounting hole is positioned at a middle-upper position. The electric assembly of the pallet carrier is installed at the bottom of the power supply mounting hole. The limiting hole which is matched with the electric assembly is dug at the bottom of the power supply unit, and after the power supply unit is inserted into the power supply mounting hole, the electric assembly is embedded in the limiting hole and limits the power supply unit.

Further, the power supply unit is set as a hand-held battery pack structure.

Further, the pallet carrier includes electric connectors; a plug-in interface is disposed on one side of the power supply unit close to the driving wheels; and the electric connectors are but-joined with the plug-in interface in a detachable plug-in way.

Further, the power supply unit is set as a single accumulator structure, and the accumulator voltage of the power supply unit is greater than 24V.

Further, the accumulator voltage of the power supply unit is set as 48V.

Further, the accumulator of the power supply unit is set as a lithium cell accumulator.

Preferably, the pallet carrier also includes an operating handle and a lifting mechanism for controlling the lifting or descending of the fork structure, and the lifting mechanism is set as an electric pump structure or a manual pump structure.

Further, the electric pump structure includes a lifting motor, a gear pump in connection with the lifting motor, an oil cylinder with a high-pressure cavity inside, an oil tank disposed on the periphery of the oil cylinder, and a contact disposed at a lateral portion of the lifting motor, wherein the lower part of the oil cylinder is connected to the carrier frame structure, a plunger piston is movably installed from the upper part to the middle part of the oil cylinder; the gear pump has an oil suction opening and an oil discharge opening, and the oil suction opening of the gear pump communicates with the oil tank via an oil suction pipe, while the oil discharge opening of the gear pump communicates with the high-pressure cavity of the oil cylinder; a one-way valve is disposed in an oil discharge pipe; the outlet of the oil discharge pipe is connected to the high-pressure cavity through a high-pressure oil discharge channel; the oil tank also communicates with a lowering return oil channel; the oil cylinder is provided with a lowering valve; the lowering valve is capable of communicating with a high-pressure oil discharge channel and the lowering return oil channel, and in such circumstance, the high-pressure cavity communicates with the oil tank.

Further, the lowering valve is a plug-in type electromagnetic valve.

Further, the lowering valve is a manual electromagnetic valve.

Further, the outlet of the oil discharge channel also communicates with an overload protection channel; the overload protection channel communicates with the lowering return oil channel through an overload return oil channel, and a safety valve is disposed between the overload protection channel and the overload return oil channel.

Further, the manual pump structure includes a manual pump set in connection with the operating handle, an oil cylinder with a high-pressure cylinder inside, and an oil tank disposed on the periphery of the oil cylinder, wherein the manual pump set includes a pump cylinder and a pump core which is movably installed in the pump cylinder and is capable of moving linearly in a repeated way; the lower part of the oil cylinder is connected to the carrier frame structure, a plunger piston is movably installed from the upper part to the middle part of the oil cylinder; the high-pressure cavity communicates with a high-pressure oil discharge channel; the oil tank communicates with a lowering return oil channel, and the lowering return oil channel communicates with the high-pressure oil discharge channel through a manual lowering valve set; a one-way valve is disposed at the middle part of the manual lowering valve set, and an outlet of the pump cylinder is connected to the one-way valve through a connecting channel Further, the connecting channel is also provided with a safety valve, and an outlet of the safety valve communicates with the lowering return oil channel through an overload return oil channel.

Based on the above technical solution, the embodiments of the present invention can generate at least the following technical effects: in the pallet carrier, the driving motor is integrated with a tyre and a hub to form an integrated driving wheel, and the driving wheel is also a hub motor as well; preferably, the driving wheel is axially provided with a shaft in the middle that is articulated to the carrier frame, thus realizing circumferential rotation and axial limiting of the driving wheels, thus ensuring the reliability and stability of the forward-backward movement of the pallet carrier, further reducing transmission accessories such as the gearbox; the overall structure is simple, and all components fit tightly and are conveniently maintained, ensuring the reliability of the overall work of the pallet carrier.

BRIEF DESCRIPTION OF THE SEVERAL VIEWS OF THE DRAWINGS

The present invention is described in further detail in conjunction with the attached drawings and embodiments, wherein.

DETAILED DESCRIPTION OF THE INVENTION

Figure 1:
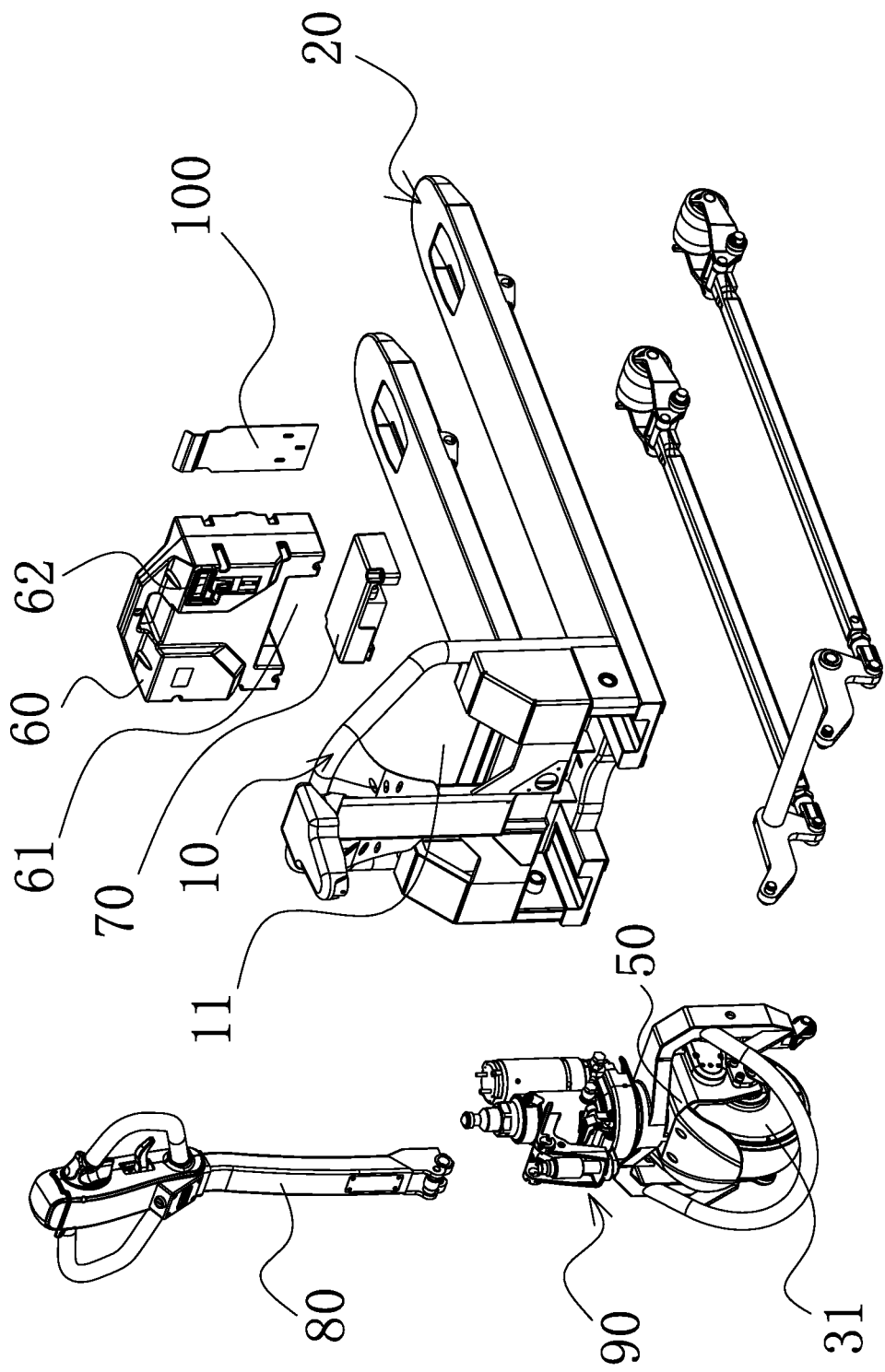
FIG. 1 is a structural view of a preferable embodiment of the present invention.
Figure 2:
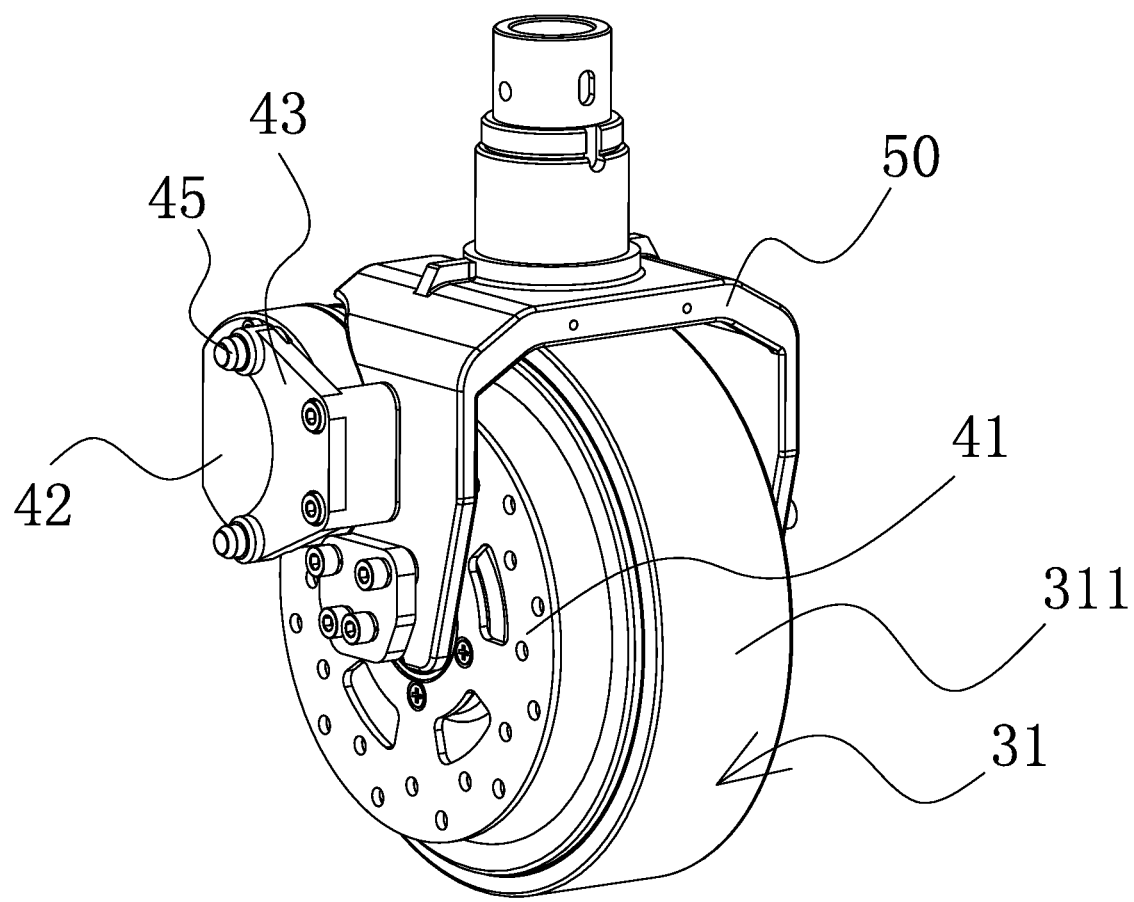
FIG. 2 is a sectional structural view of an embodiment of the present invention.
Figure 3:
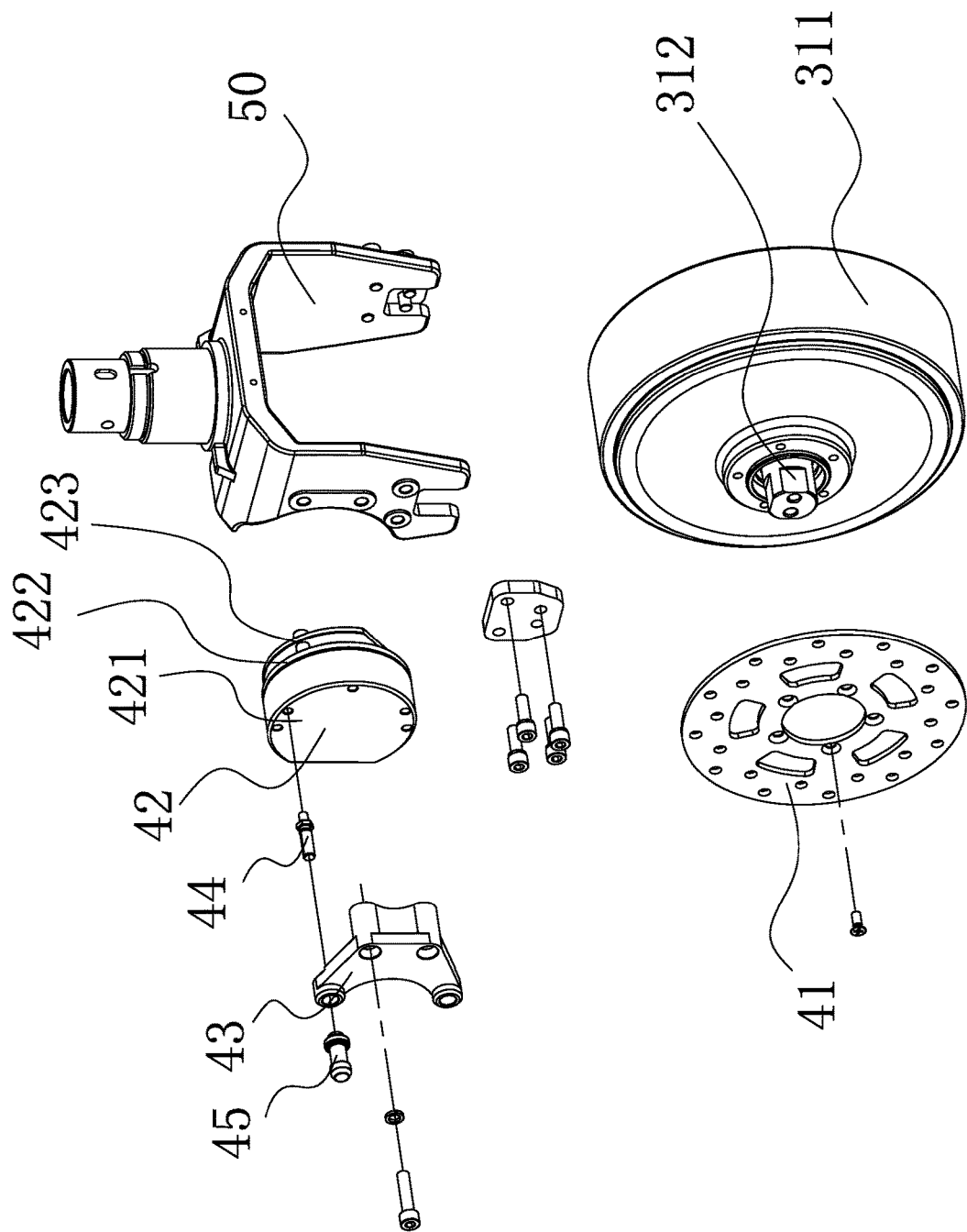
FIG. 3 is an exploded view of FIG. 2.
Figure 4:
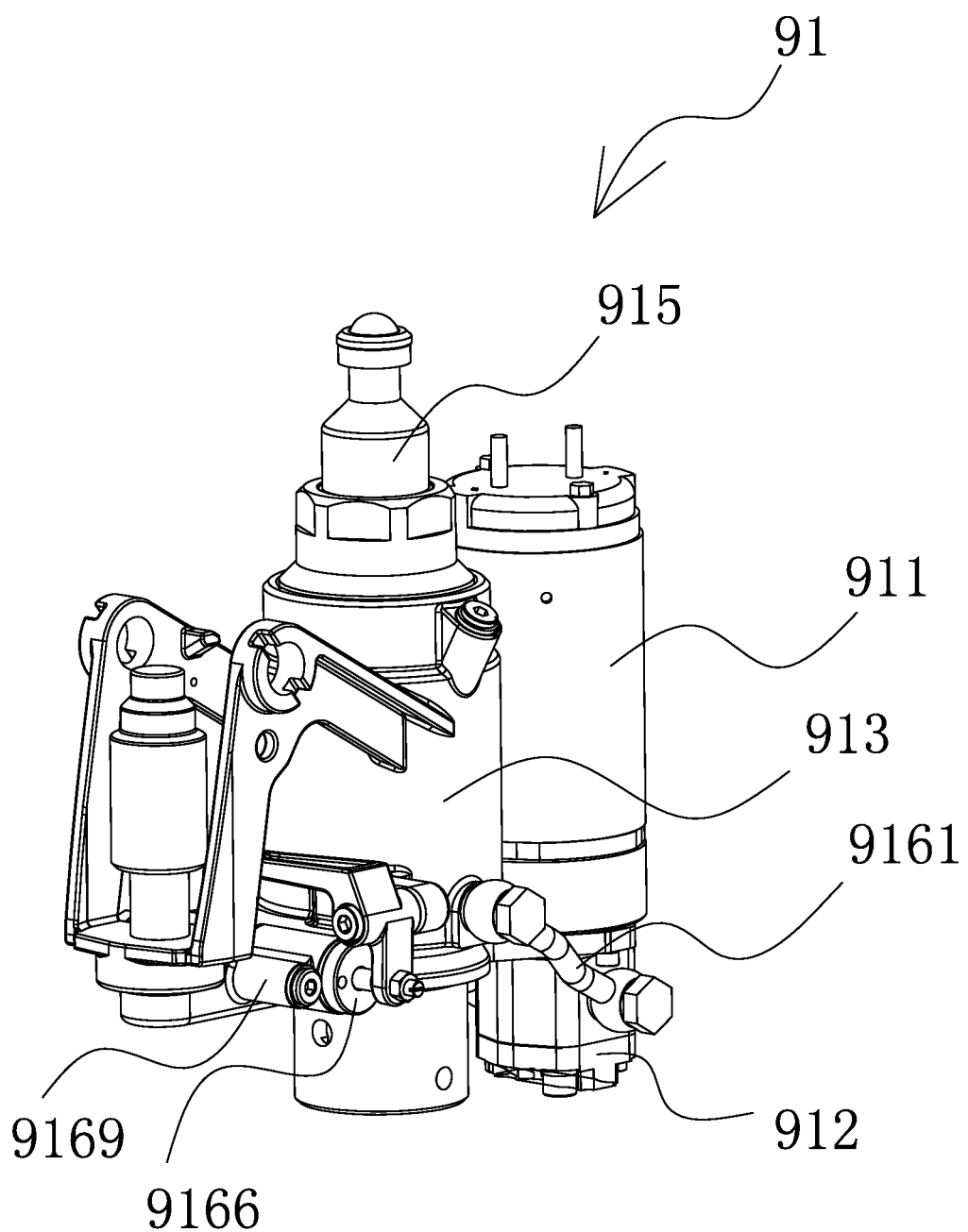
FIG. 4 is a structural view of an electric pump structure in a preferable embodiment of the present invention.
Figure 5:
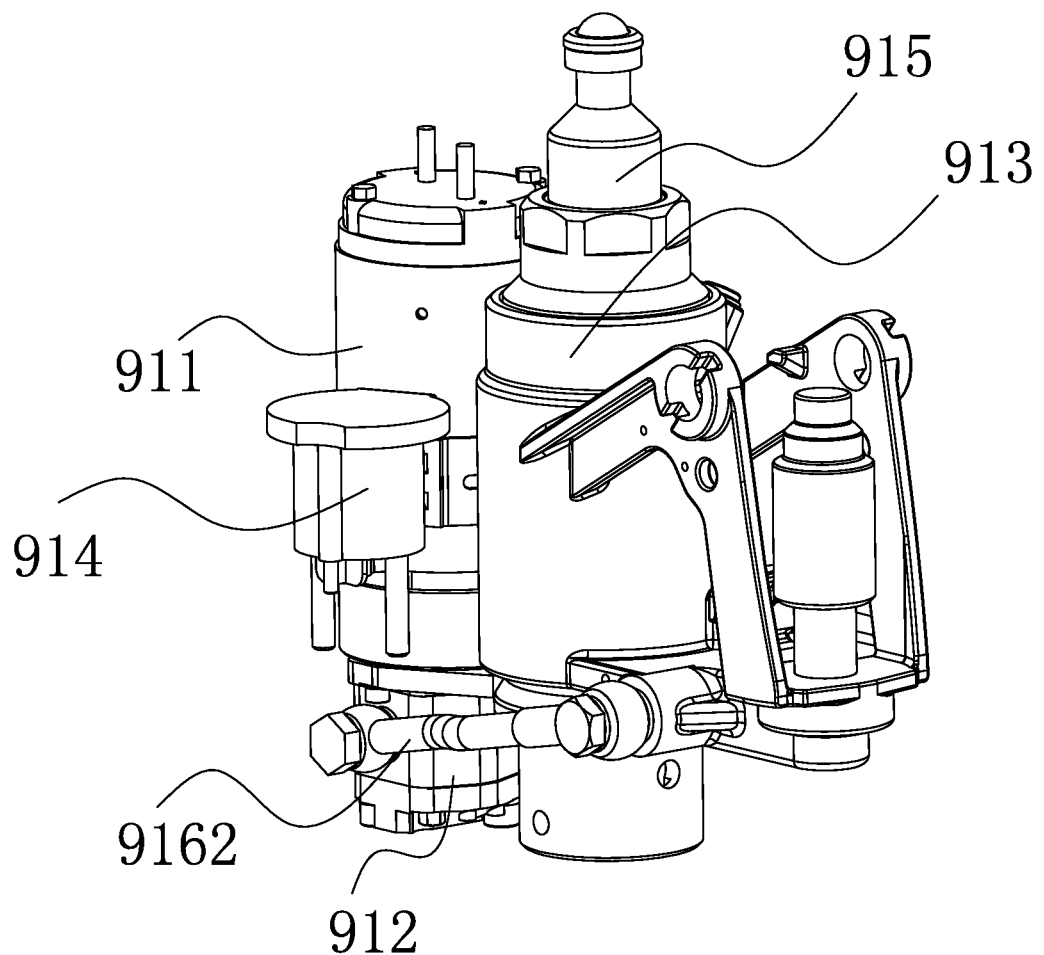
FIG. 5 is a structural view of FIG. 4 from another angle.
Figure 6:
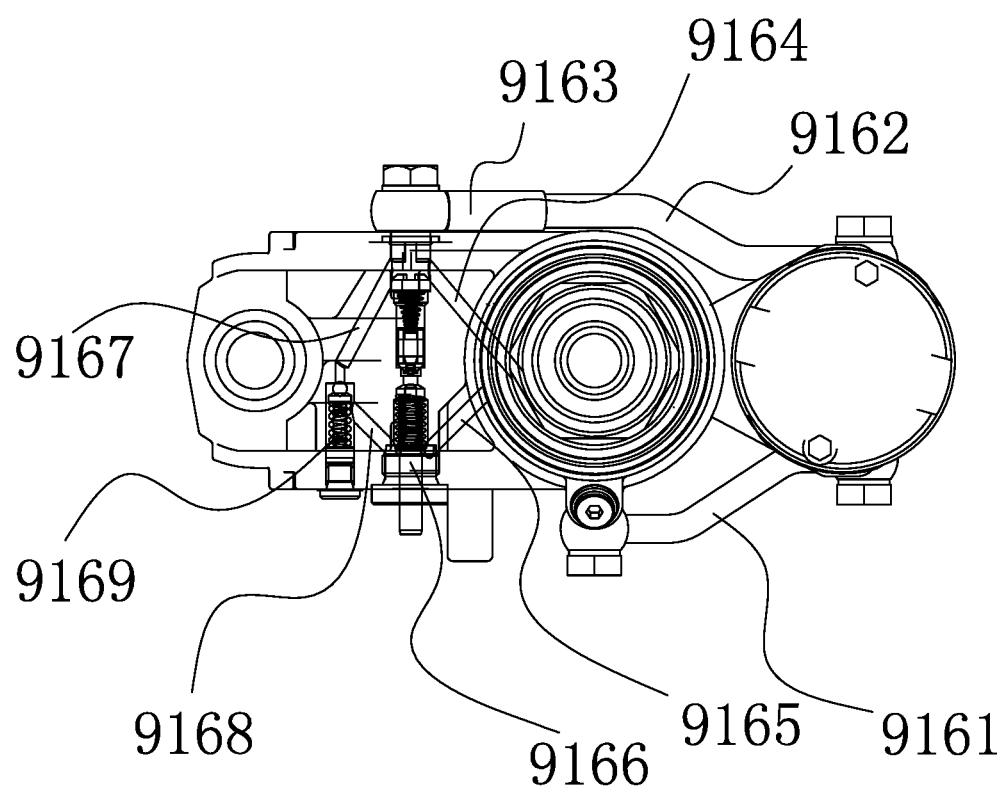
FIG. 6 is a structural view of FIG. 5 from another angle.
Figure 7:
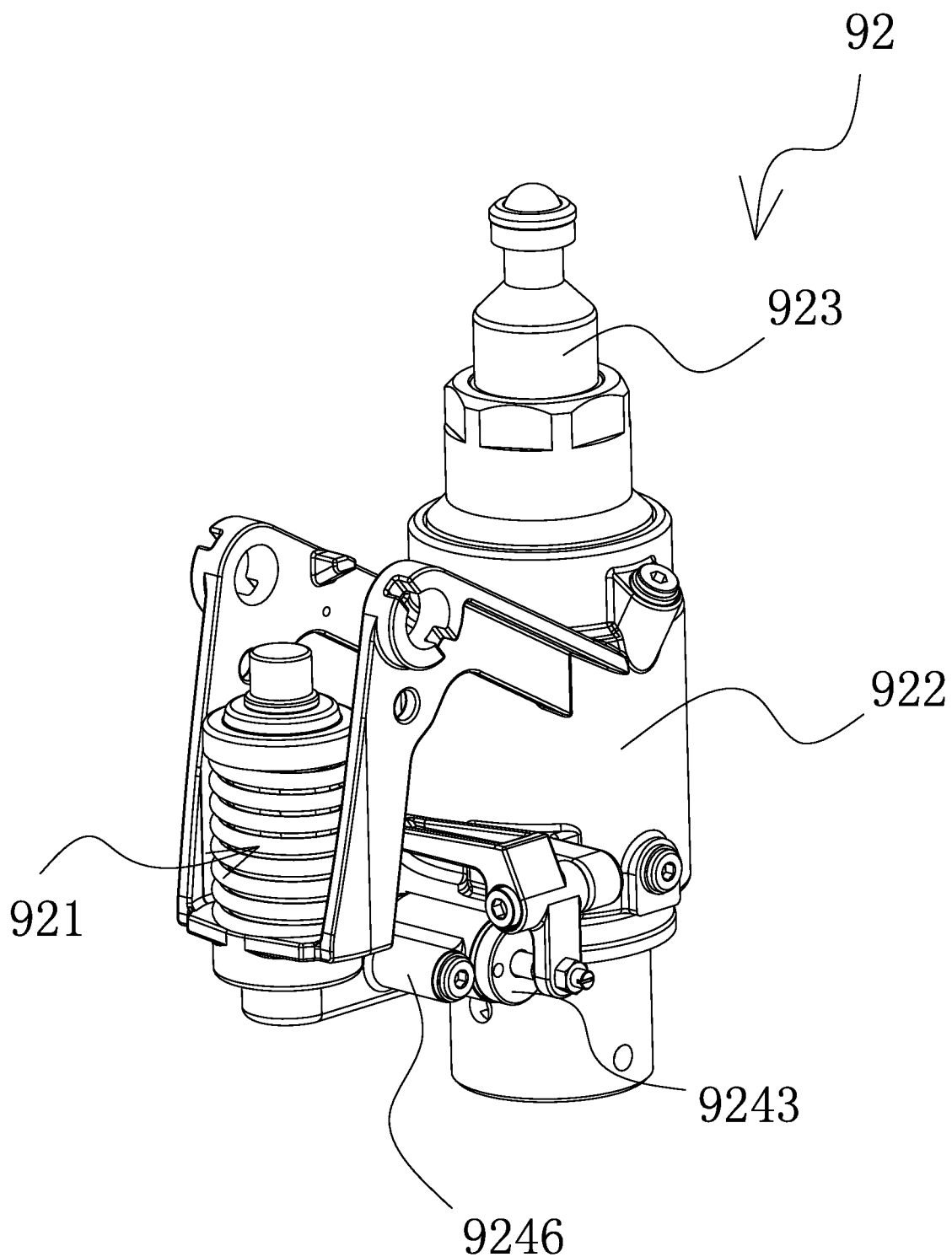
FIG. 7 is a structural view of a manual pump structure in a preferable embodiment of the present invention.
Figure 8:
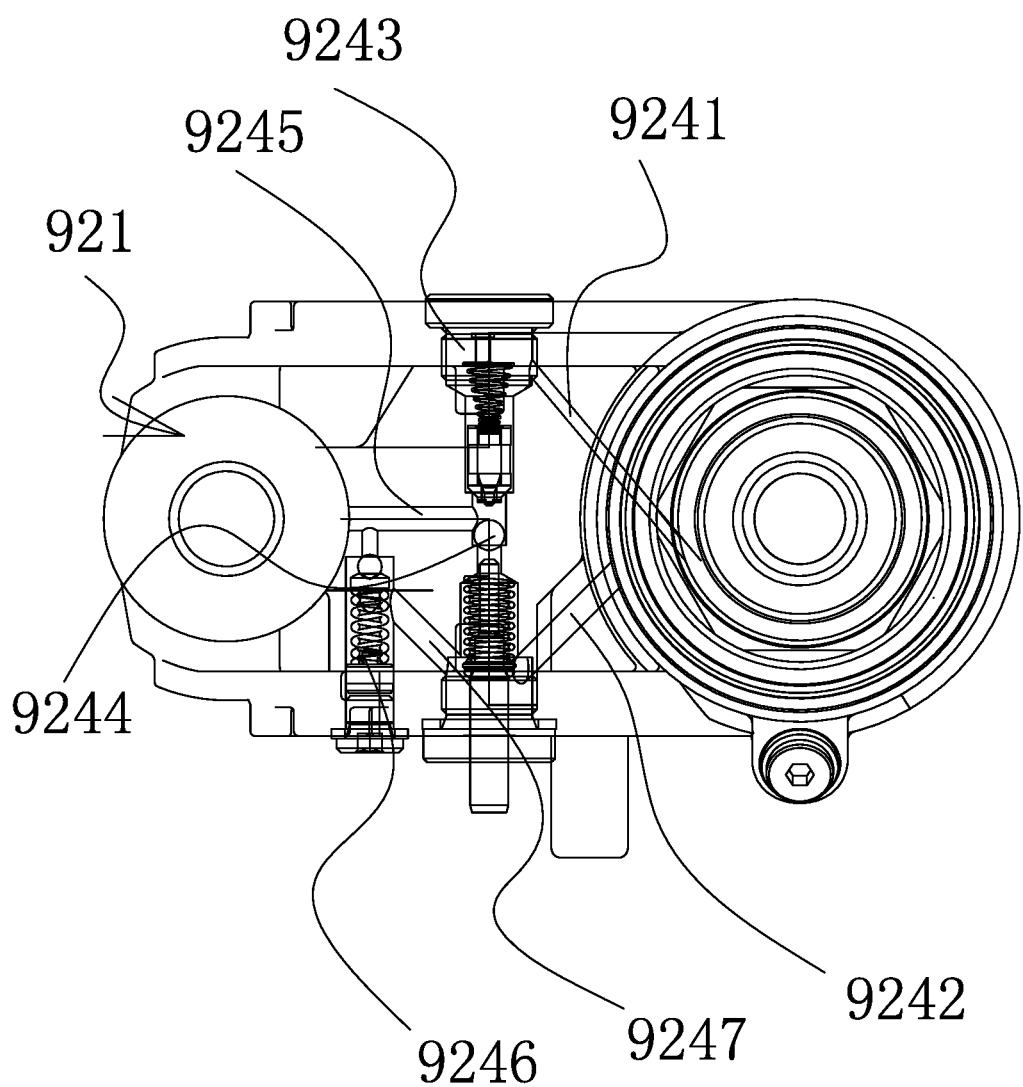
FIG. 8 is a structural view of FIG. 7 from another angle.
Figure 9:
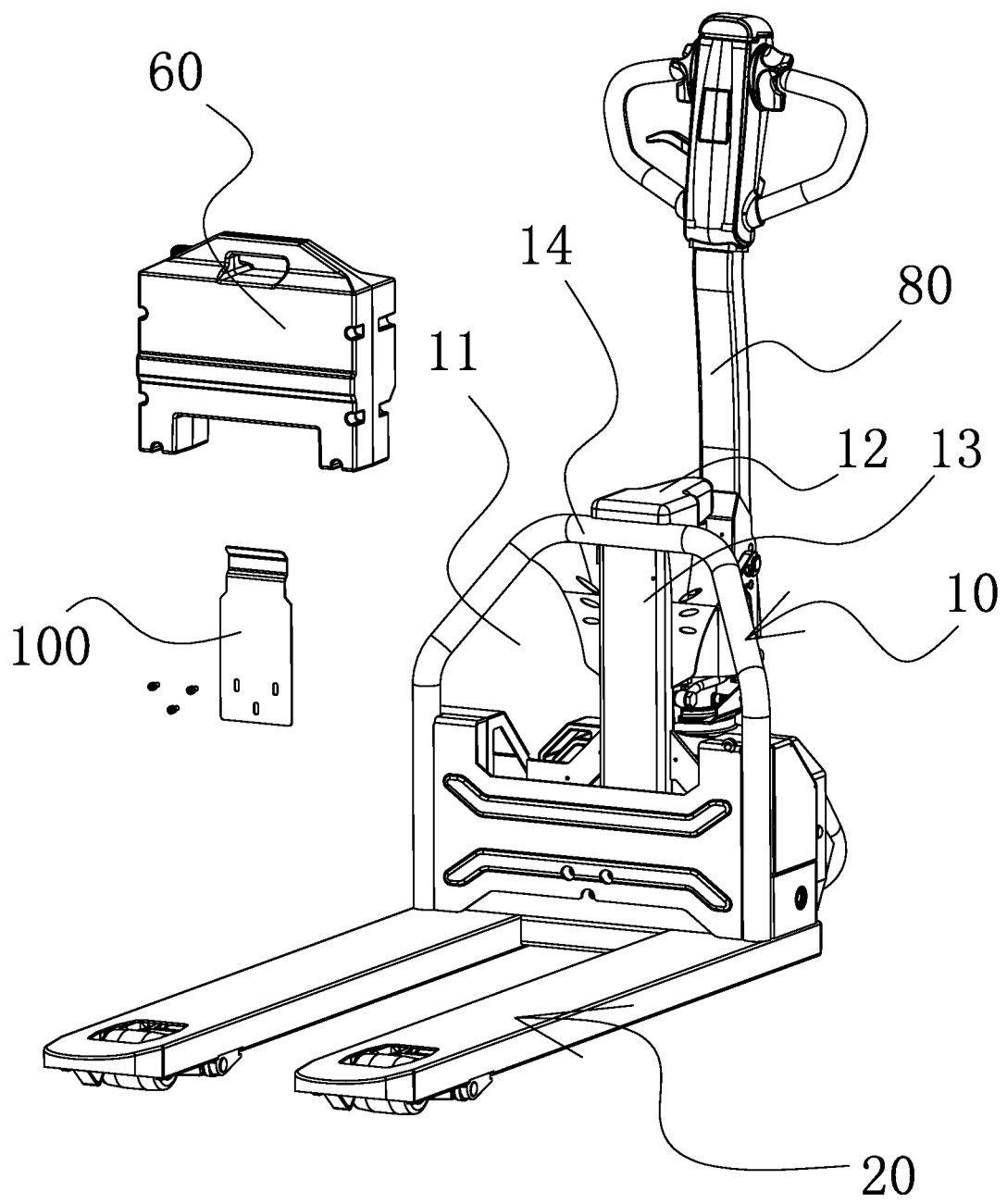
FIG. 9 is a structural view of FIG. 1 from another angle.

The technical solution of the present invention is further described in conjunction with preferred embodiments and attached drawings of the present invention, but the present invention is not limited to those embodiments.

The technical solution provided by the present invention is described in further detail in conjunction with FIG. 1-14.

As shown in FIG. 1-9, a pallet carrier includes a carrier frame structure 10; a fork structure 20, disposed on the carrier frame structure 10; a driving wheel structure, wherein the driving wheel structure includes driving wheels 31 which are articulated to the carrier frame structure 10 and are positioned behind the fork structure 20, and each one of the driving wheels 31 is set as a one-piece wheel structure integrated with a driving motor, a tyre and a hub.

In the present invention, distinguished from the existing pallet carriers with a complicated driving structure (including a motor, a speed reducing gearbox, traveling wheels, etc.), the pallet carrier of the present invention has a reasonable overall structure design. The driving motor is integrated with the tyre and the hub to form an integrated driving wheel 31, and the driving wheel is actually a hub motor as well, with the speed reducing gearbox removed. Preferably, the driving wheel 31 is axially provided with a shaft in the middle that is articulated to the carrier frame 10, thus realizing circumferential rotation and axial limiting of the driving wheel 31, thus ensuring the reliability and stability of the forward-backward movement of the pallet carrier, further reducing transmission accessories such as the gearbox; the overall structure is simple, and all components fit tightly and are conveniently maintained, ensuring the reliability of the overall work of the pallet carrier.

In addition, it is worth mentioning that the driving wheel 31 in this solution is structurally set to be close fit with other parts of the pallet carrier such that the overall center of gravity of the rear of the pallet carrier is lower than that of the pallet carrier structure with an existing individual driving motor and traveling wheels, which means that the rear center of gravity of the rear of the pallet carrier of the present invention moves downward in comparison with other pallet carriers, so the working reliability is obviously enhanced, and production cost is obviously reduced.

Further, preferably, the articulated connection setting between the driving wheels 31 and the carrier frame 10 in the present solution is as follows: each one of the driving wheels 31 includes a round disc-shaped hub motor main body 311 and a connecting shaft 312 which is axially disposed at the middle part of the hub motor main body 311, each one of the connecting shafts 312 is in an articulated connection to each corresponding one of the hub motor main bodies 311, and each one of the connecting shafts 312 extends out of each corresponding one of the hub motor main bodies 311 and is connected to the carrier frame structure 10. Here, the connection between the connecting shafts 312 and the carrier frame structure 10 is preferably a detachable fixed installation.

Each one of the connecting shafts 312 can be a single shaft which axially penetrates through the middle part of each corresponding one of the hub motor main bodies 311, or can be two shafts which are respectively on two sides of each corresponding one of the hub motor main bodies 311. Each one of the hub motor main bodies 311 is equivalent to a rotor which rotates around a stator structure, namely the connecting shaft 312, so all of the driving wheels 31 work reliably, ensuring the movement reliability of the pallet carrier.

In the present invention, the traveling wheels are changed into the integrated hub motor structure. In order to ensure the braking effect and the baking reliability, preferably, the driving wheel mechanism also includes a brake structure for braking the driving wheels 31 (namely the hub motor main bodies 311). The brake structure includes a brake disc 41 which is fixedly installed on one side of each one of the hub motor main bodies 311 and a disc brake structure which is disposed on the carrier frame structure 10 and plays a role of braking the brake disc 41, and a partial structure that corresponds to each one of the connecting shafts 312 runs through each corresponding one of the brake discs 41. Further preferably, each one of the brake discs 41 is a round disc structure, and the part thereof that is penetrated by each corresponding one of the connecting shafts 312 is the middle part.

When the pallet carrier moves, each one of the hub motor main bodies 311 rotates the articulated shaft, and the brake discs 41 rotate synchronously. In order to brake the pallet carrier, each one of the disc brake structures is controlled to close each corresponding one of the brake discs 41 to realize braking of all of the driving wheels 31, and then the pallet carrier stops moving.

Preferably, each one of the disc brake structures includes a brake 42 which is installed on the carrier frame structure 10 through a bracket 43; each one of the brakes 42 includes an electromagnet 421, a friction rotor 422 and a friction stator 423 in turn, wherein the electromagnet 421 is disposed close to the bracket 43, a thrust structure is disposed between the electromagnet 421 and the friction rotor 422, an edge of each one of the brake discs 41 is partially positioned between each corresponding one of the friction rotors 422 and each corresponding one of the friction stators 423; each one of the thrust structures always applies an outward thrust to each corresponding one of the friction rotors 422, namely a thrust away from each corresponding one of the electromagnets 421, and further preferably, each one of the thrust structures is at least one spring structure.

The present invention adopts the mode where the electromagnets and the thrust structures are mutually matched, and compared with the existing hydraulic disc brake structure, has the following obvious difference: when the pallet carrier moves, each one of the electromagnets 421 is controlled to adsorb each corresponding one of the friction rotors 422, and at this time, each one of the brake discs 41 respectively forms a clearance with each corresponding one of the friction rotors 422 and each corresponding one of the friction stators 423, so the pallet carrier is running When the pallet carrier needs to brake, the electromagnets 421 are removed, so the adsorption force disappears; in such circumstance, by the thrust effect of the thrust structure (namely the restoring force of a spring when the thrust structure is set as a spring), each one of the friction rotors 422 moves outward and extrudes each corresponding brake disc 41, and each corresponding one of the brake discs 41 is gradually closed by the friction effects of each corresponding one of the friction rotors 422 and each corresponding one of the friction stators 423, and each one of the driving wheels 31 is driven to brake, thus finally braking the pallet carrier.

Furthermore, in order to ensure the reliability of the disc brake structures, in the present invention, floating accessories are also provided as aiding units; specifically, each one of the brakes 42 and each corresponding one of the brackets 43 are installed with a floating structure; preferably, each one of the brakes 42 and each corresponding one of the brackets 43 are installed with a mounting screw 44 and a rubber sleeve 45, wherein one end of each one of the mounting screws 44 has one end which penetrates through each corresponding one of the electromagnets 421 and the other end which penetrates through each corresponding one of the brackets 43 and is inserted into each corresponding one of the rubber sleeves 45, so that a preset floating interval is formed between each one of the brakes 42 and each corresponding one of the brackets 43, eliminating the effects of stress on the brackets 43 and the carrier frame structure 10 during braking, overcoming the effects caused by rigid connection between each one of the brakes 42 and each corresponding one of the brackets 43.

In order to ensure that the driving wheels 31 are in a tight fit with other parts of the pallet carrier and to ensure the stability and reliability of the steering action of the driving wheels 31, as an optimization, the connecting shafts 312 respectively stand on two sides of each one of the hub motor main bodies 311, and a driving base 50 is rotationally installed behind the fork structure 20, wherein the upper part of the driving base 50 is set as a bearing structure, while the lower part of the driving base 50 is set as an arch-shaped base structure, and two ends of the base structure correspond to the connecting shafts 312 which respectively stand on two sides; the connecting shaft structure on each side is in a rigid connection with the corresponding base structure, and further preferably, the connecting shaft 312 on each side is detachably installed at an end of the corresponding base structure through a driving mounting plate.

Further, preferably, each one of the brackets 43 can be detachably installed on one side of the base structure corresponding to each corresponding one of the connecting shafts 312, and each one of the brackets 43 is positioned above each corresponding one of the driving mounting plates, to avoid interference, enhance the compactness of the structure layout, and ensure that the pallet carrier has a simple structure and works reliably and stably; furthermore, preferably, each one of the base structures is formed with a gap on one side where each one of the brackets 43 is installed to accommodate each corresponding one of the brakes 42, thus enhancing the compactness of the layout, and ensuring a fit connection with each corresponding one of the brake discs 41.

As a preferable or optional embodiment, the pallet carrier is also provided with a battery pack-type power supply structure, overcoming the defects of inconvenient changing of the accumulator, complicated charging and discharging, and relatively low working reliability; specifically, the carrier frame structure 10 is formed with a power supply mounting hole 11, and the pallet carrier also includes a power supply unit 60 which is electrically connected to the driving wheels 31, wherein the power supply 60 is set as a battery pack structure, the power supply unit 60 can be inserted into the power supply mounting hole 11 and limited therein, which means that the power supply unit 60 is inserted into the power supply mounting hole 11, and the power supply mounting hole 11 is internally provided with a preset limiting structure for limiting the power supply unit 60.

In the present solution, the power supply unit 60 is preferably set as a single battery pack structure which can be conveniently inserted onto the carrier frame structure 10 of the pallet carrier or dismantled carrier frame 10; the dismantled power supply unit 60 is conveniently charged, and when the power supply unit 60 on the pallet carrier has low capacity or is exhausted, the power supply unit 60 can be conveniently replaced with a new one, meeting the efficient working demands and obviously enhancing the working efficiency. In order to ensure reliability of installation, the power supply unit 60 is limited by the preset limiting structure on the power supply mounting hole 11 after being inserted into the power supply mounting hole 11, ensuring the installation firmness and limiting accuracy of the power supply unit 60, and ensuring smooth connection between the power supply unit 60 and the hole.

In addition, the power supply unit 60 in the form of the battery pack structure not only avoids defects of the power supply from multiple accumulators, but also simplifies the structural layout of the pallet carrier structure, saves components such as the external cover plate, panel, radiating structure, etc. The corresponding carrier frame structure 10 can be, preferably, an adaptive rod-like or hollowed structure which is simple and highly practical. The power supply 60 is conveniently changed.

Preferably, in the present invention, the opening of the power supply mounting hole 11 is positioned at a middle-upper position, to facilitate the plug-in and exit of the power supply unit 60; an electric assembly 70 of the pallet carrier is installed at the bottom of the power supply mounting hole 11; a limiting hole 61 which is matched with the electric assembly 70 is dug at the bottom of the power supply unit 60; and after the power supply unit 60 is inserted into the power supply mounting hole 11, the electric assembly 70 is embedded into the limiting hole 61 and limits the power supply unit 60.

In the present solution, the limiting structure for limiting the power supply unit 60 includes, but is not only limited to, the above mentioned electric assembly 70 and the corresponding limiting hole 61. Preferably, a corresponding limiting structure can be disposed on the inner side of the power supply mounting hole 11, so the power supply unit 60 can be limited from the front and the rear, achieving a reliable limiting effect. Namely, the power supply unit 60 is not only electrically clamped with the electric assembly 70, but also contacts the limiting structures such as the inner wall of the hole after being plugged into the hole.

In order to enhance the convenience in use, plugging, dismantling, carrying and transport, preferably, the power supply unit 60 is set as a hand-held battery pack structure, and the power supply unit 60 is preferably inserted into the power supply mounting hole 11 from the top down or downward in an inclined way. After passing through the power supply mounting hole 11 in an inclined way, the power supply unit 60 can return upright and then be continuously vertically inserted downward, so the installed power supply unit 60 is placed vertically, ensuring stability during working, and ensuring tight connection with the electric assembly 70.

Further preferably, the pallet carrier includes electric connectors for performing connection between the driving wheels 31 and the power supply 60; a plug-in interface 62 for charging and discharging is disposed on one of the power supply units 60 close to the driving wheels 31; the electric connectors are connected with the plug-in interface 62 of the power supply unit 60 in a detachable plug-in mode. With such structural layout, the power supply unit 60 charges and discharges reliably and is conveniently operated, and can be randomly plugged in use; and to remove the power supply unit 60, only the corresponding interfaces of the electric connectors need to be pulled down, so the practicability is high.

Preferably, in order to ensure the reliability of installation and limiting of the power supply unit 60 and to ensure the stability of the power supply unit 60 when the pallet carrier is moving, preferably, the pallet carrier is also provided with a battery pressing plate 100 which is disposed in front of the power supply unit 60 and tightly presses the power supply unit 60 on the carrier frame 10.

The accumulator voltage of the existing pallet carrier is normally set as 24V, resulting in a relatively large current and reducing the service life of the accessories of the pallet carrier. In order to overcome those defects, as an optimization, the power supply unit 60 is set as a single accumulator structure, and the accumulator voltage of the power supply unit 60 is greater than 24V. Such structural layout not only reduces the flowing current and prolongs the service of the components of the pallet carrier, but also reduces cost, and therefore has a characteristic of large applicable range. Further, the accumulator voltage of the power supply unit 60 is set as 48V, further avoiding defects of the accumulator structure of the 24V and 36V low-voltage pallet carriers, ensuring that the power supply unit 60 outputs a low current, and prolonging the service life. Preferably, the accumulator of the power supply unit 60 is set as a lithium cell accumulator, further improving the charging structure of the accumulator of the existing pallet carrier, shortening the charging time, and ensuring working efficiency.

As a preferable or optional embodiment, the pallet carrier also includes an operating handle 80 and a lifting mechanism 90 for controlling the lifting and descending of the fork structure 20, which means that the lifting mechanism 90 controls the lifting operation of the fork of the pallet carrier; and the lifting mechanism 90 can be set as an electric pump structure 91 or a manual pump structure 92.

The pallet carrier of the present invention is preferably set as an electric traveling pallet carrier which is provided with integrated driving wheels 31 and the corresponding power supply unit 60, realizing electric traveling. In the present solution, the pallet carrier can also conduct electric lifting and manual lifting. Further, the electric lifting can be classified into pure electric lifting and semi-automatic lifting (namely electric lifting, manual descending). In addition, the pallet carrier can also realize steering, and the steering can be set as electric steering or manual steering, ensuring reliable working and high universality. In the present solution, the manual pump structure 92 can also be applicable to the manual pallet carrier.

Specifically, in the present solution, a preferable layout of the electric pump structure 91 is as follows. The electric pump structure 91 includes a lifting motor 911, a gear pump 912 which is in connection with the lifting motor 911 and is preferably disposed at the lower part of the lifting motor 911, an oil cylinder 913 with a high-pressure cavity inside, an oil tank disposed on the periphery of the oil cylinder 913, and a contact 914 disposed at a lateral portion of the lifting motor 911, and is also preferably provided with an oil filing opening which is disposed on the outer side of the oil tank and has an opening inclining upward, and the oil filling opening is also provided with an end cap; the lower part of the oil cylinder 913 is connected to the carrier frame structure, a plunger piston 915 is movably installed from the upper part to the middle part of the oil cylinder 913, the gear pump 912 has an oil suction opening and an oil discharge opening, and the oil suction opening of the gear pump 912 communicates with the oil tank via an oil suction pipe 9161, while the oil discharge opening of the gear pump 912 communicates with the high-pressure cavity of the oil cylinder 913 through an oil discharge pipe 9162, preferably the oil suction pipe 9161 and the oil discharge pipe 9162 are respectively arranged on two sides of the oil tank; a one-way valve 9163 is disposed in the oil discharge pipe 9162; the outlet of the oil discharge pipe 9162 is connected to the high-pressure cavity through a high-pressure oil discharge channel 9164; the oil tank also communicates with a lowering return oil channel 9165, the oil cylinder 913 is provided with a lowering valve 9166, the lowering valve 9166 is capable of communicating with a high-pressure oil discharge channel 9164 and the lowering return oil channel 9165, and in such circumstance, the high-pressure cavity communicates with the oil tank.

In the present invention, the electric pump structure 91 includes components such as an oil cylinder 913, a lifting motor 911, and a gear pump 912; when the lifting switch of the pallet carrier is pressed, a contact 914 is electrified such that the lifting motor 911 is electrified to rotate and drive the gear pump 912 to work; the oil suction opening of the gear pump 912 is connected to the oil tank outside the oil cylinder 913 through an oil suction pipe 9161 and has the other end which is connected with the high-pressure cavity in the oil cylinder 913 through the oil discharge pipe 9162, thus realizing lifting action of the plunger piston 915 of the oil cylinder 913; the oil discharge pipe 9162 is internally provided with a one-way valve 9163, wherein the one-way valve 9163 conducts a sealing function when the lifting motor 911 stops working, avoiding the oil in the high-pressure cavity from flowing back into the oil tank; during descending, a descending handle knob on the operating handle 80 can be pulled to contact the lowering valve 9166, so that the high-pressure oil discharge channel 9164 communicates with the descending return oil channel 9165, which means that the high-pressure cavity communicates with the oil tank, and the descending action is performed through the weight of goods or the dead weight of the carrier frame structure 10.

When the pallet carrier is set into the electric descending mode, preferable, the lowering valve 9166 is set as a plug-in type electromagnetic valve; when the pallet carrier is set into the manual descending mode, preferably, the lowering valve 9166 is set as a manual lowering valve. The manual lowering valve replaces the plug-in type electromagnetic valve to realize semi-electric control, namely electric lifting and manual descending. Therefore, the pallet carrier has a wide applicable range and high practicability. Further, the pallet carrier is also provided with an overload protection structure; preferably, the outlet of the oil discharge channel 9162 also communicates with an overload protection channel 9167; the overload protection channel 9167 communicates with the lowering return oil channel 9165 through an overload return oil channel 9168, and a safety valve 9169 is disposed between the overload protection channel 9167 and the overload return oil channel 9168.

If the carrier is overloaded during lifting, then the high-pressure oil pushes open the safety valve 9169 through the overload protection channel 9167, flows through the overload return oil channel 9168 and the lowering return oil channel 9165, enters the oil tank, conducting the safety protection function and ensuring more reliable and safer work.

In the present solution, a preferable configuration of the manual pump structure 92 is as follows: the manual pump structure 92 includes a manual pump set 921 in connection with the operating handle 80, an oil cylinder 922 with a high-pressure cylinder inside, and an oil tank disposed on the periphery of the oil cylinder 922, and preferably, an oil filling opening with an opening which inclines upward is formed at the outer side of the upper part of the oil tank, and the oil filling opening is provided with an end cap; the manual pump set 921 includes a pump cylinder and a pump core which is movably installed in the pump cylinder and is capable of moving linearly in a repeated way; the lower part of the oil cylinder 922 is connected to the carrier frame structure; a plunger piston 923 is movably installed from the upper part to the middle part of the oil cylinder 922; the high-pressure cavity communicates with a high-pressure oil discharge channel 9241; the oil tank communicates with a lowering return oil channel 9242, and the lowering return oil channel 9242 communicates with the high-pressure oil discharge channel 9241 through a manual lowering valve set 9243; a one-way valve 9244 is disposed at the middle part of the manual lowering valve set 9243, and an outlet of the pump cylinder is connected to the one-way valve 9244 through a connecting channel 9245. Further, the connecting channel 9245 is also provided with a safety valve 9246, and an outlet of the safety valve 9246 communicates with the lowering return oil channel 9242 through an overload return oil channel 9247.

In the present invention, the configuration of the manual pump structure 92 removes the lifting motor 911 and the gear pump 912 on the basis of the electric pump structure 91, but adds the manual pump 921, realizing the manual lifting function, thus reducing cost and enhancing cost performance of the product. During working, levering the operating handle 80 of the pallet carrier up and down can drive the pump core in the manual pump set 921 to move in a reciprocating way; when the pump core exits, the pressure in the pump cylinder reduces to absorb the steel ball of the one-way valve 9244 away such that the oil in the oil tank flows through the lowering return oil channel 9242 and enters the pump cylinder; when the pump core descends, the pressure in the pump cylinder increases to push the steel ball to seal one side of the oil tank and pressurizes the oil such that the oil flows into the high-pressure oil discharge channel 9241 and then enters the high-pressure cavity, thus raising the plunger piston 923; when the carrier is overloaded, the high-pressure oil in the pump cylinder pushes open the safety valve 9246, flows through the overload return oil channel 9247 and the lowering return oil channel 9242 and then returns back into the oil tank, conducting the safety protection function; during descending, the lowering handle knob of the operating handle is pulled to touch the manual lowering valve set 9243 in the oil cylinder 922 such that the high-pressure oil discharge channel 9241 communicates with the lowering return oil channel 9242, which means that the high-pressure cavity communicates with the oil tank, thus realizing the lowering action through the weight of goods or the dead weight of the carrier frame structure 10.

Figure 10:
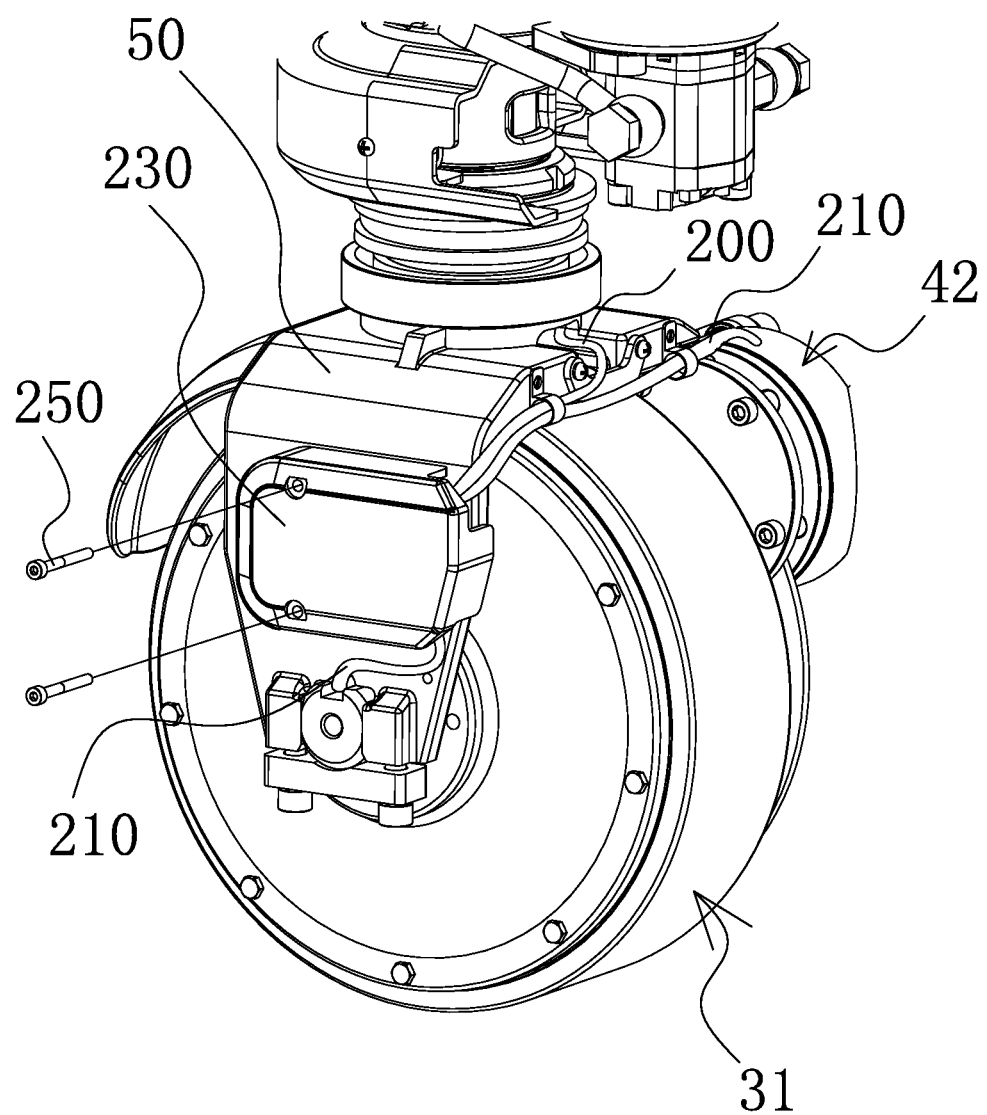
FIG. 10 is a structural view of a wiring structure of a pallet carrier in a preferable embodiment of the present invention.
Figure 11:
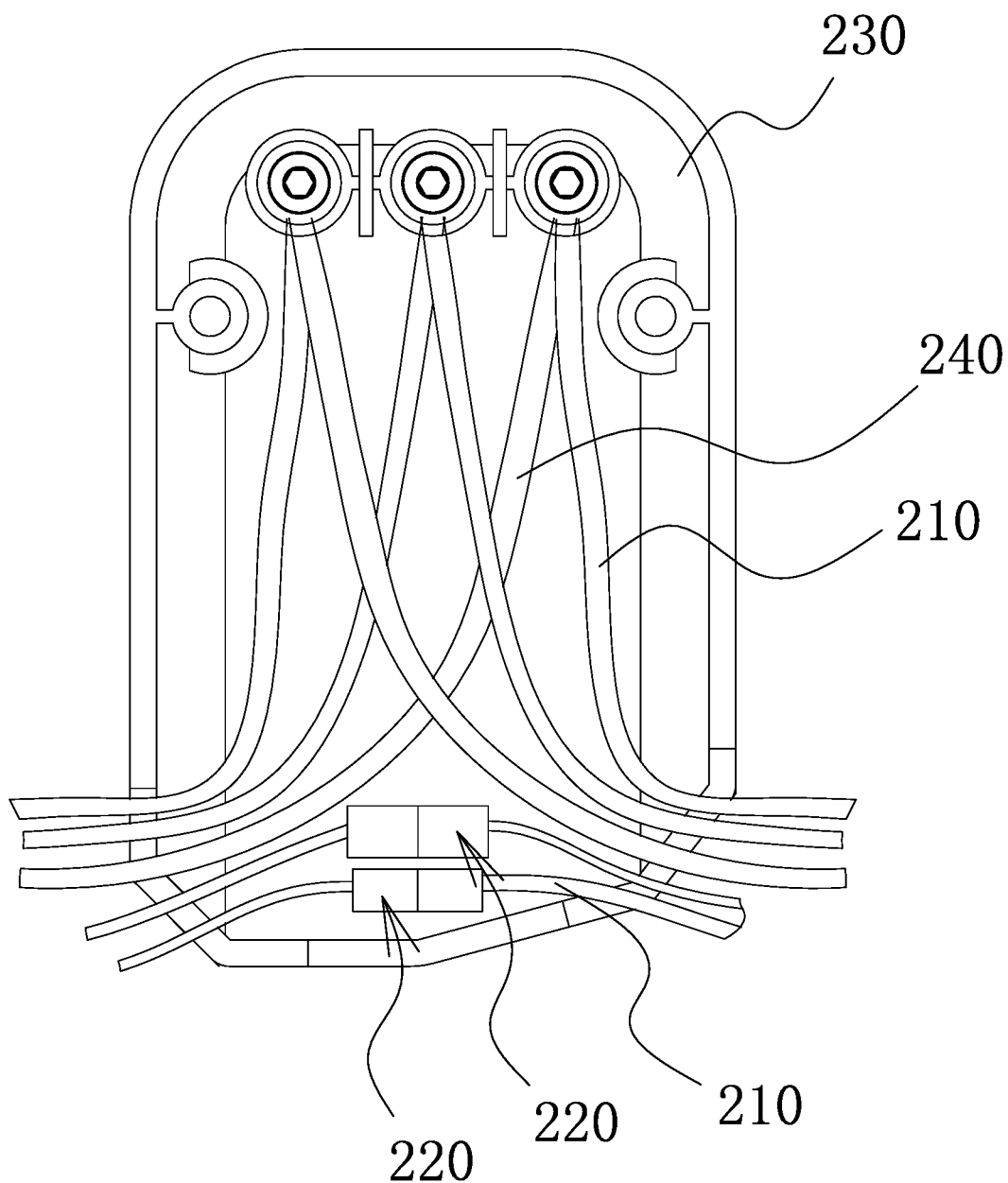
FIG. 11 is a structural view of a wiring block in a preferable embodiment of the present invention.
Figure 12:
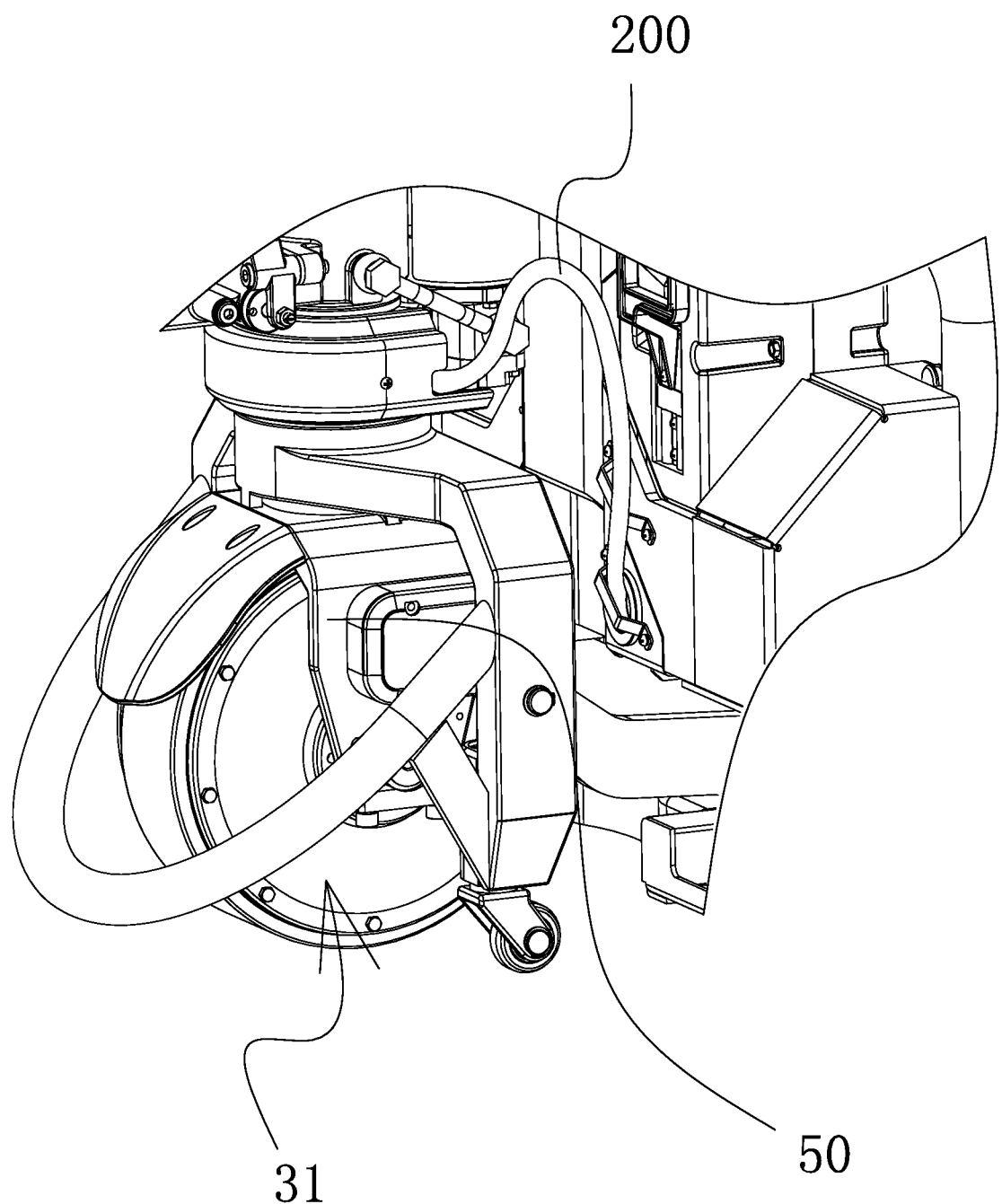
FIG. 12 is a structural view of FIG. 10 from another angle.

As a preferable or optimal embodiment, in conjunction with FIG. 10-12, the present invention also provides an improved solution of a wiring structure of the pallet carrier: the wiring structure includes a controller, a driving base 50, a driving wheel 31 which is articulated to the lower part of the driving base 50, a brake 42 which is installed on the driving base 50 and can brake the driving wheel 31, wherein the controller leads out of a main wire harness 200, the main wire harness 200 is respectively electrically connected with the driving wheel 31 and the brake 42 through respective connecting wires 210 and adaptive connectors 220, and each one of the connectors 220 respectively includes connecting structures corresponding to the interfaces of two corresponding sections of connecting wires 210. In the present solution, the driving wheel 31 is a one-piece wheel structure integrated with a driving wheel 31 and a hub, which is articulated to the driving base 50 of the pallet carrier and braked by the brake 42. The controller is placed on the exterior of the driving base 50, and preferably, the main wire harness 200 passes through the upper part structure of the driving base 50 to reach the periphery of the driving base 50 and then is respectively connected with the driving wheel 31 and the brake 42, avoiding the excessive exposure of main wire hardness 200 and connecting wires 210, and also avoiding interference with the work of the driving wheel 31. As shown in FIG. 12, the main wire harness 200 passes through the upper part structure of the driving base 50, is exposed out and then is connected with the controller.

The wiring structure of the pallet carrier has a contact layout. The main wire harness 200 of the controller passes through the upper part structure of the driving base 50 to reach the periphery of the driving base 50 and then is respectively connected with the driving wheel 31 and the brake 42, avoiding the excessive exposure of main wire hardness 200 and connecting wires 210, and also avoiding interference with the work of the components of the pallet carrier such as the driving wheel 31; the controllers are connected with the driving wheel 31 and the controller 42 by using both connectors 220 in a quick connection manner, the outgoing wire of each one of the motors and the brakes 42 is respectively provided with a quick coupling at one end, and the outgoing wire (namely the connecting wire branched from the main wire harness) of the corresponding controller is provided with an adapted quick coupling, so the adaptive quick connection can be performed in various ways such as plugging connection, quick screwing and magnetic adsorption. Through such wiring, it only needs to disconnect the corresponding connectors 220 when the driving wheel 31 and the brake 42 need to be maintained later, and quick connection can be performed when the driving wheel 31 and the brake 42 need to be used. In this way, the wiring above the driving base 50 is not adjusted, and dismantling from the top down to remove the main wire harness 200 at the upper part structure of the driving base 50 is not needed, so convenience is brought to the subsequent maintenance, installation and dismantling, and the practicability is high. Further, the connection structure is set as a buckling structure in the present solution, and furthermore, the connector 220 is a plastic buckle which performs buckling connection.

As a preferable or optional embodiment, a wiring block 230 is detachably installed on the outer side of the driving base 50, and the connector 220 and a corresponding part of the connecting wire 210 can be placed on the inner side of the wiring block 230. Further, the main wire harness 200 in the present solution not only respectively has a sensor wire (Hall connecting wire) connected to the driving wheel 31 and the outgoing wire of the brake 42 through the connecting wires 210 and the adaptive connectors 220, but also connected with multiple phase wires 240 of the driving wheel 31 through the connecting wires 210 and a phase wire knock-down structure, and the phase wires 240 outgoing form the driving wheel 31, the phase wire knock-down structure and the corresponding connecting wires 210 are also placed on the inner side of the wiring block 230. In this way, the phase wires U/V/W outgoing from the driving wheel (namely the driving hub motor) can be connected with the main wire harness through a convenient phase wire knock-down structure such as screws. In the present solution, the main wire harness branches multiple connecting wires and are connected with the phase wires and sensor wires that outgo from the driving wheel, and the brake wires, capable of realizing quick dismantling and installation conveniently.

The motor phase wires 240 and the corresponding knock-down structure, and the connectors 220 of the controller, driving wheel 31 and brake 42 can all be accommodated and limited in the wiring block 230, ensuring the work reliability of the whole pallet carrier and convenience in the subsequent maintenance. Simply by pulling out the connecting wires of the main harness of the controller, the whole driving base 50 together with the driving wheel 31 and the brake 42 can be quickly served and maintained. Moreover, the wiring block 230 is placed on the outer side of the driving base 50, and preferably on the side away from the brake 42, further avoiding interference with the work of the components of the pallet carrier such as the driving wheel 31. The structure design is reasonable and ingenuous.

As shown in FIG. 11, in the present solution, the connectors 220 of the brake 42 and the Hall (sensor) connector 220 of the motor are all tightly disposed on the inner side of the wiring block 230. In order to further enhance the compactness of the layout, the outgoing wires of the controller, driving wheel, and brake respectively enter the wiring block 230 along the outer wall of the driving base 50. The wiring block 230 can also accommodate and configure the phase wires of the motor inside, enhancing the utilization rate of the space.

In the present solution, the outgoing wires of the brake 42 and the outgoing wires of the driving wheel 31 are connected with the connecting wires 210 of the controller through the wiring block 230. Such structural layout design brings convenience in subsequent maintenance and dismantling. If existing approximately direct connections are adopted, all wires need to be dismantled from the top down, so more time is needed, and the difficulty is very huge. Further, the wiring block 230 can be dismantled from and installed with the driving base 50 through a screw structure 250, so the structure is simple and is conveniently dismantled and installed.

Figure 13:
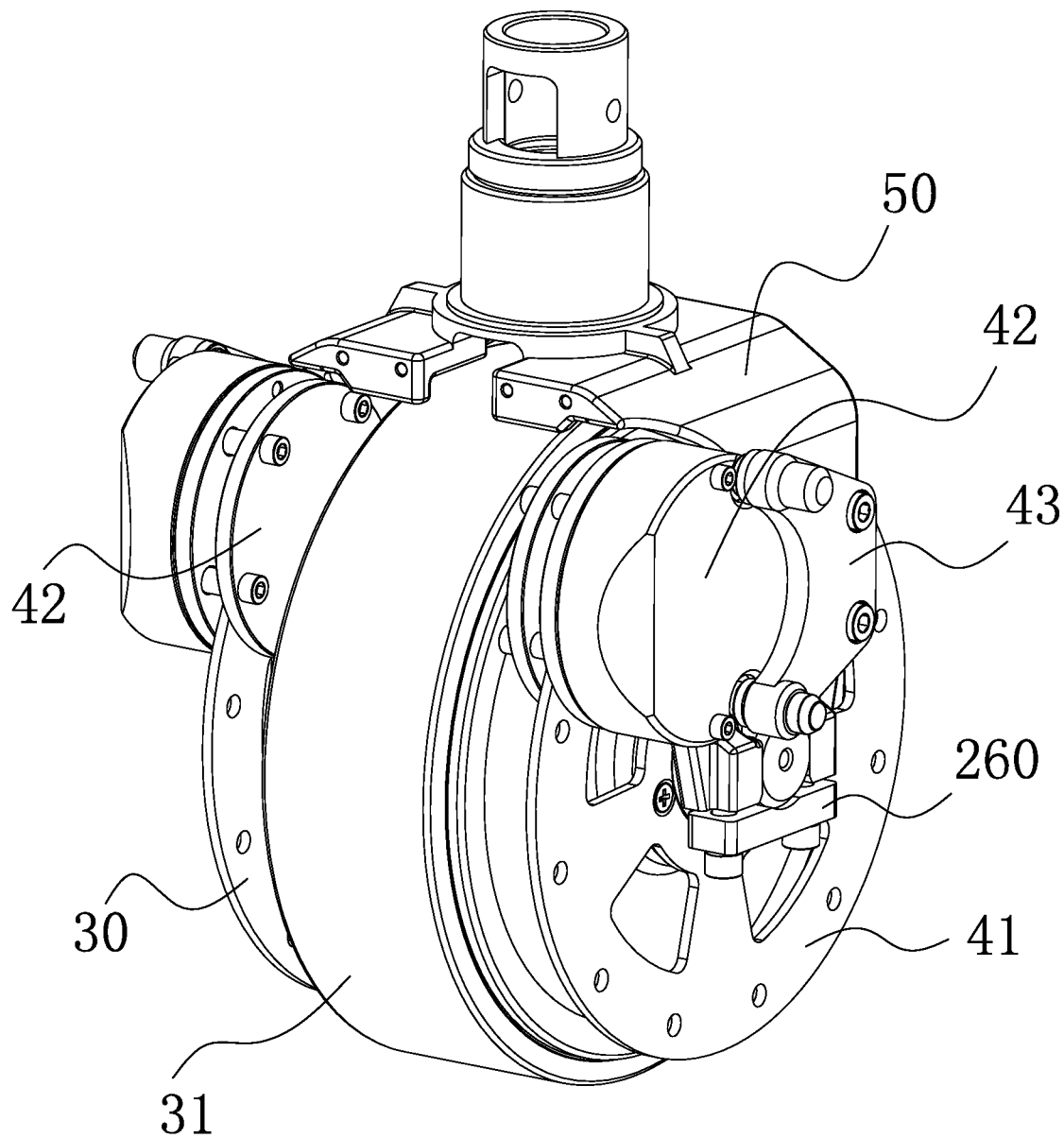
FIG. 13 is a sectional structural view of a pallet carrier which is set as a dual brake structure in a preferable embodiment of the present invention.
Figure 14:
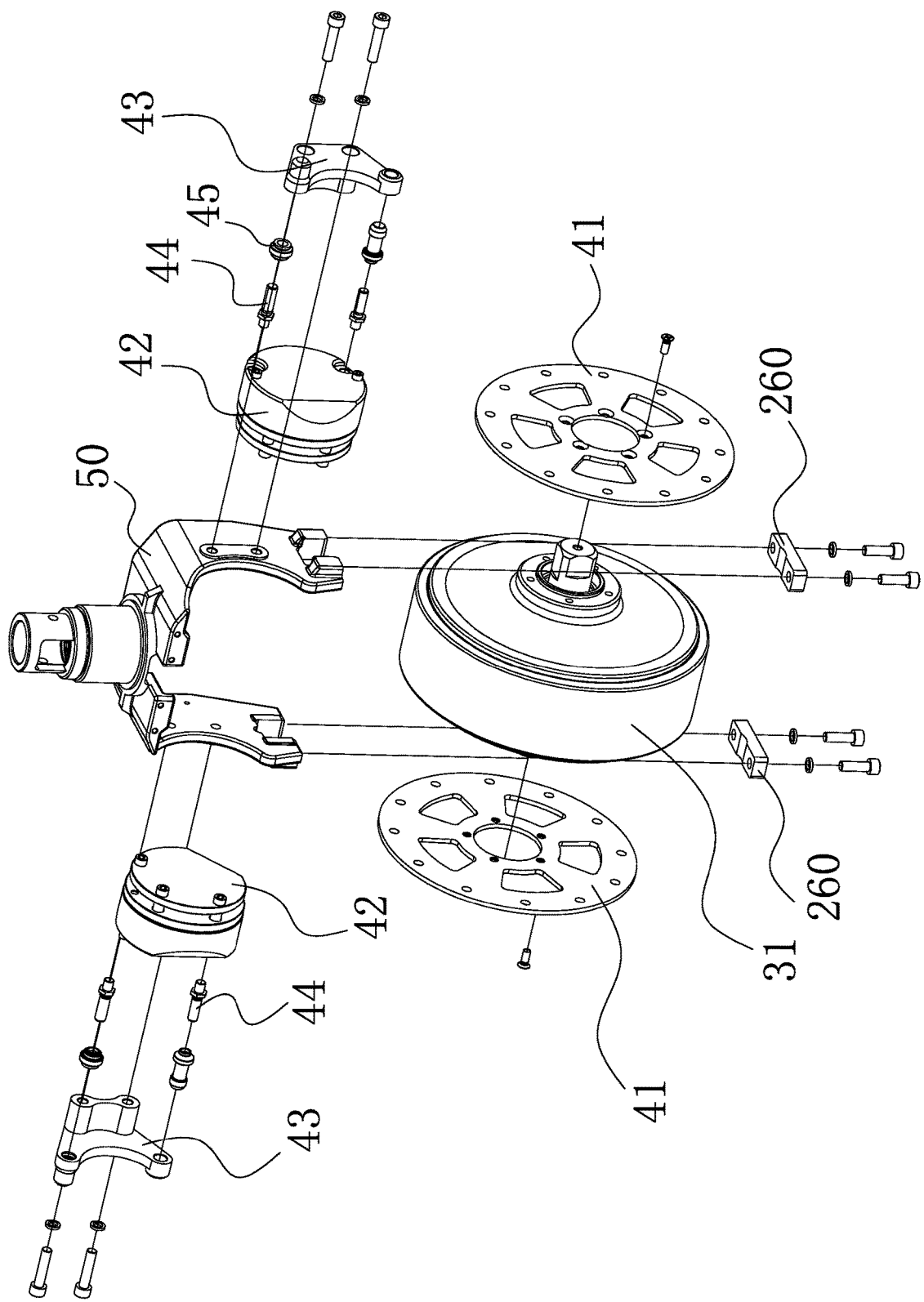
FIG. 14 is an exploded view of FIG. 13.

As a preferable or optional embodiment, the pallet carrier in the present invention can also be configured as a dual brake structure. Specifically, as shown in FIG. 13 and FIG. 14, the pallet carrier includes driving bases 50; driving wheels 31, namely hub motor structures, wherein the driving wheels 31 in the present solution are one-piece wheel structures respectively integrated with a driving wheel 31 and a hub, the driving wheels 31 are driving elements and traveling wheels as well; at least one brake disc 41 which is articulated to each one of the driving bases 50 and is installed each one of the driving wheels 31; brakes 42, wherein two brakes are provided and matched with the brake discs 41, and each one of the brakes 42 brakes each corresponding one of the brake discs 41. The dual brake structure of the pallet carrier of the present invention has a compact and reasonable layout. The dual brake structure is an electromagnetic disc brake structure. In order to obtain better braking abilities, a dual brake structure is adopted, wherein the driving wheels 31 (namely hub motors) are articulated to the driving base 50; during traveling, the driving wheels 31 rotate; during braking, the two brakes 42 are driven to brake the brake discs 41, thus obtaining better baking abilities, ensuring reliable work and bringing convenience in subsequent maintenance.

In the present solution, the brake disc 41 can be configured as one or two that respectively stand on two sides of each one of the driving wheels 31; when a single brake disc 41 is configured; two brakes 42 and the brake disc 41 are placed on the same side of each one of the driving wheels 31;

when two brake discs 41 are configured, two brakes 42 respectively stand on two sides of each one of the driving wheels 31 and correspond to the brake discs 41 one by one. Simply speaking, when two brake discs 41 are adopted, the brakes 42 are respectively on two sides, and when one brake disc 41 is adopted, two brake discs 42 are respectively installed on the same size, capable of realizing the same braking effect.

In the present invention, each one of the brakes 42 is detachably installed on the driving base 50 through a bracket 43; the two brakes 42 respectively stand on two sides of each one of the driving bases 50; each one of the driving bases 50 is provided with opening structures in which the brakes 42 are placed, so the layout of the whole structure is more compact. Further, each one of the brakes 42 is connected with each corresponding one of the brackets 43 through a mounting screw 44; each one of the mounting screws 44 is sleeved with a rubber sleeve 45; each one of the rubber sleeve 45 is disposed between each one of the brakes 42 and each corresponding one of the brackets 43, playing the role of reducing vibration and allowing each one of the brakes to float axially. Preferably, each one of the brackets 43 is installed on the outer side of each corresponding one of the driving bases 50 through a fixed screw and a spring washer, ensuring reliability of connection and convenience of dismantling and installation. Preferably, each one of the brake discs 41 is installed on each corresponding one of the driving wheels 31 through a screw structure.

Motor shafts are exposed on both sides of each one of the driving wheels 31; each one of the driving bases 50 is provided with a downward opening structure on each one of the sides; the motor shafts on two sides of each one of the driving wheels 31 are respectively embedded in corresponding opening structures and are fixed on corresponding structures of the driving bases 50 through a fixed block 260; and each one of the fixed blocks 260 is adapted to each corresponding one of the opening structures; and preferably, each one of the fixed blocks 260 is installed on each corresponding structure of the driving bases 50 through a screw and a spring washer. Such structural configuration ensures reliable connection between the driving wheels 31 and the driving bases 50, firm limiting of the motor shaft, and work stability and reliability.

In the present invention, the car frame structure 10 includes a top cover 12, an upright 13 which is connected with the top cover 12 and positioned below the top cover 12, a support pipe 14, which is a one-piece singular pipe structure, wherein an end portion of the support pipe 14 is connected with the fork structure 20, two ends thereof contact the fork structure 20, the middle part of the support pipe 14 is tightly disposed at the rear part of the top cover 12; and the upright 13 is disposed at the middle part of the support pipe 14, close to the front. The carrier frame structure of the pallet carrier has a reasonable overall design; the support pipe 14 forms a left and right support structure on two sides of each one of the uprights 13, but the left and right support structure is integrally processed by the same pipe. Integrated processing has advantages of compact structure, high manufacturability, high structural strength, etc. The structural strength of the existing split support pipe 14 is inferior to that of the integrated support pipe, and the support pipe 14 is positioned in the rear part of the top cover 12. The support pipe 14 is positioned outside the top cover 12, and is not inserted into or penetrated through the top cover 12. Therefore, the structure of the entire carrier is more contact and ingenuous, finally achieving the effect that the entire carrier is operated flexibly and comfortably.

In the present invention, the fork structure 20 has a fork moving function; the top cover 12 is a stressed position where the oil cylinder of the fork structure 20 of the pallet carrier directly contacts the carrier frame; during working, the piston rod of the oil cylinder extends out and ejects the top cover 12 such that the whole carrier frame together with the fork structure 20 rises at the same time; the uprights 13 and the support pipes 14 are components that ensure rigid connection between the top cover 12 and the fork structure 20, so the connection between the top cover 12 and the fork structure 20 is strong enough to realize the function of the fork structure 20 carrying and moving goods.

As a preferable or optional embodiment, the uprights 13 are structured as rectangular pipes. Such structural setting, compared with existing similar structure layout where the upright is a U-shaped plate welded with a piece of flat plate, the upright in the present solution has higher welding strength, the rectangular pipe application is more convenient and simpler in terms of processing technology, which means that the structure of the rectangular pipe upright 13 has higher strength, and the production and processing are more convenient. Further, in order to ensure structural strength, enhance the tight fit between the one-piece support pipe 14 and the top cover 12 and between the one-piece support pipe 14 and the upright 13, ensure that the structure of the entire carrier is more compact and ingenuous, and improve the operating flexibility and comfort level, preferably, the support pipe 14 is in a welded connection with the rear part of the top cover 12, which means that the middle position of the support pipe 14 (namely the middle position of the upper part of the support pipe 14) is in a welded connection with the rear part of the top cover 12; in the present solution, the support pipe 14 is in a pressed connection with and fixed in a welding way with the rear part of the top cover 12, and the middle part of the support pipe 14 is placed the rear-middle position of the top cover 12.

The specific embodiments described in the text are used for illustrating the principle of the present invention only. Those skilled in the art can make various amendments or supplementations or make similar substitutions on the basis of the described specific embodiments. The amendments, supplementations, and substitutions should fall within the principle or the protective scope claimed by the claims of the present invention.

What is claimed is:

1. A pallet carrier, comprising:
   a carrier frame structure;
   a fork structure, disposed on the carrier frame structure;
   a driving wheel mechanism, characterized by comprising driving wheels which are articulated to the carrier frame structure, wherein the driving wheels are configured as a one-piece structure which is integrated with a driving motor and wheel hubs;
   the carrier frame structure is formed with a power supply mounting hole; the pallet carrier also comprises a power supply unit which is set as a battery pack structure, wherein the power supply unit can be inserted into the power supply mounting hole and is limited therein;
   an electrical assembly of the pallet carrier is installed at a bottom of the power supply mounting hole, and a limiting hole is dug at the bottom of the power supply unit.

2. The pallet carrier according to claim 1, characterized in that each one of the driving wheels comprises a hub motor main body and a connecting shaft which is articulated with the hub motor main body, and each one of the connecting shafts extends out of each corresponding hub motor main body and is connected to the carrier frame structure.

3. The pallet carrier according to claim 2, characterized in that the driving wheel mechanism also comprises a brake structure, and the brake structure comprises a brake disc which is disposed on one side of the hub motor main body and a disc brake structure which plays the role of actuating the brake disc.

4. The pallet carrier according to claim 3, characterized in that the disc brake structure comprises a brake which is installed on the carrier frame structure through a bracket.

5. The pallet carrier according to claim 4, characterized in that the brake and the bracket are installed with a floating structure, and the brake and the bracket form a preset floating interval there-between.

6. The pallet carrier according to claim 2, characterized in that the connecting shafts separately stand on two sides of each of the hub motor main bodies; a driving base is rotationally installed behind the fork structure; a lower part of the driving base is set as a seat structure of which the two ends respectively correspond to the connecting shaft structures on two sides, and the connecting shaft structure on each side is in a rigid connection with each corresponding one of the seat structure.

7. The pallet carrier according to claim 1, characterized in that the opening of the power supply mounting hole is positioned at a middle-upper position; the electrical assembly of the pallet carrier is installed at the bottom of the power supply mounting hole; the limiting hole which is matched with the electrical assembly is dug at the bottom of the power supply unit; and after the power supply unit is inserted into the power supply mounting hole, the electrical assembly is embedded in the limiting hole and limits the power supply unit.

8. The pallet carrier according to claim 1, characterized in that the power supply unit is set as a hand-held battery pack structure.

9. The pallet carrier according to claim 1, characterized in that the pallet carrier comprises electric connectors; a plug-in interface is disposed on one side of the power supply unit close to the driving wheels; and the electric connectors are but-joined with the plug-in interface in a detachable plug-in way.

10. The pallet carrier according to claim 1, characterized in that the power supply unit is set as a single accumulator structure, and the accumulator voltage of the power supply unit is greater than 24V.

11. The pallet carrier according to claim 10, characterized in that the accumulator of the power supply unit is set as a lithium cell accumulator.

12. The pallet carrier according to claim 1, characterized in that the pallet carrier also comprises an operating handle and a lifting mechanism for controlling the lifting or descending of the fork structure, and the lifting mechanism is set as an electric pump structure or a manual pump structure.

13. The pallet carrier according to claim 12, characterized in that the electric pump structure comprises a lifting motor, a gear pump in connection with the lifting motor, an oil cylinder with a high-pressure cavity inside, an oil tank disposed on the periphery of the oil cylinder, and a contact disposed at a lateral portion of the lifting motor, wherein a lower part of the oil cylinder is connected to the carrier frame structure, a plunger piston is movably installed from the upper part to the middle part of the oil cylinder; the gear pump has an oil suction opening and an oil discharge opening, and the oil suction opening of the gear pump communicates with the oil tank via an oil suction pipe, while the oil discharge opening of the gear pump communicates with the high-pressure cavity of the oil cylinder; a one-way valve is disposed in an oil discharge pipe; the outlet of the oil discharge pipe is connected to the high-pressure cavity through a high-pressure oil discharge channel; the oil tank also communicates with a lowering return oil channel; the oil cylinder is provided with a lowering valve; the lowering valve is capable of communicating with a high-pressure oil discharge channel and the lowering return oil channel, and in such circumstance, the high-pressure cavity communicates with the oil tank.

14. The pallet carrier according to claim 13, characterized in that the lowering valve is a plug-in type electromagnetic valve.

15. The pallet carrier according to claim 13, characterized in that the lowering valve is manual electromagnetic valve.

16. The pallet carrier according to claim 13, characterized in that the outlet of the oil discharge channel also communicates with an overload protection channel; the overload protection channel communicates with the lowering return oil channel through an overload return oil channel, and a safety valve is disposed between the overload protection channel and the overload return oil channel.

17. The pallet carrier according to claim 12, characterized in that the manual pump structure comprises a manual pump set in connection with the operating handle, an oil cylinder with a high-pressure cylinder inside, and an oil tank disposed on the periphery of the oil cylinder, wherein the manual pump set comprises a pump cylinder and a pump core which is movably installed in the pump cylinder and is capable of moving linearly in a repeated way; the lower part of the oil cylinder is connected to the carrier frame structure, a plunger piston is movably installed from the upper part to the middle part of the oil cylinder; the high-pressure cavity communicates with a high-pressure oil discharge channel; the oil tank communicates with a lowering return oil channel, and the lowering return oil channel communicates with the high-pressure oil discharge channel through a manual lowering valve set; a one-way valve is disposed at the middle part of the manual lowering valve set, and an outlet of the pump cylinder is connected to the one-way valve through a connecting channel.

18. The pallet carrier according to claim 17, characterized in that the connecting channel is also provided with a safety valve, and an outlet of the safety valve communicates with the lowering return oil channel through an overload return oil channel.

* * * * *